United States Patent
Freese et al.

(10) Patent No.: US 11,227,184 B1
(45) Date of Patent: Jan. 18, 2022

(54) SYSTEMS AND METHODS FOR MACHINE LEARNING MODELS FOR PERFORMANCE MEASUREMENT

(71) Applicant: Grand Rounds, Inc., San Francisco, CA (US)

(72) Inventors: Nathaniel Freese, San Francisco, CA (US); Meera Rao, San Francisco, CA (US); Rick Wolf, San Francisco, CA (US); Peyton Rose, San Francisco, CA (US); Stephen Martin, San Francisco, CA (US); Sameer Soi, San Francisco, CA (US); Zachary Taylor, San Francisco, CA (US); Ye Wang, San Francisco, CA (US)

(73) Assignee: GRAND ROUNDS, INC., San Francisco, CA (US)

(*) Notice: Subject to any disclaimer, the term of this patent is extended or adjusted under 35 U.S.C. 154(b) by 0 days.

(21) Appl. No.: 17/209,769

(22) Filed: Mar. 23, 2021

(51) Int. Cl.
*G06K 9/62* (2006.01)
*G06N 20/00* (2019.01)
*G06F 16/242* (2019.01)
*G06F 16/2458* (2019.01)
*G06Q 30/02* (2012.01)

(52) U.S. Cl.
CPC ......... *G06K 9/623* (2013.01); *G06F 16/2443* (2019.01); *G06F 16/2465* (2019.01); *G06K 9/6259* (2013.01); *G06K 9/6298* (2013.01); *G06N 20/00* (2019.01); *G06Q 30/0282* (2013.01)

(58) Field of Classification Search
None
See application file for complete search history.

(56) References Cited

U.S. PATENT DOCUMENTS

| 8,996,350 B1* | 3/2015 | Dub | G06F 16/35 704/1 |
|---|---|---|---|
| 10,204,143 B1* | 2/2019 | Dub | G06F 16/24578 |
| 2014/0188780 A1* | 7/2014 | Guo | G06N 7/005 706/52 |
| 2021/0019321 A1* | 1/2021 | Ehrlich | G06F 9/505 |

FOREIGN PATENT DOCUMENTS

WO WO-2016167824 A1 * 10/2016 ............. G06N 20/20

* cited by examiner

*Primary Examiner* — Tahmina N Ansari
(74) *Attorney, Agent, or Firm* — Finnegan, Henderson, Farabow, Garrett & Dunner, LLP

(57) ABSTRACT

Methods, systems, and computer-readable media for generating a statistically covaried machine learning model for performance measurement of service providers. The method receives a configuration file that includes one or more parameters associated with a plurality of individuals and parses it to generate and executing the database query on input data to generate sets of tabulated data of individuals of the plurality of individuals. The method next determines one or more measures of service providers listed in the configuration file using two or more tabulated data of individuals from the sets of tabulated data of individuals. The method finally generates a covaried machine learning model by training a machine learning model by statistically covarying measures and using them as training data.

20 Claims, 10 Drawing Sheets

SYSTEMS AND METHODS FOR MACHINE LEARNING MODELS FOR PERFORMANCE MEASUREMENT

BACKGROUND

An ever increasing amount of data and data sources are now available to researchers, analysts, organizational entities, and others. This influx of information allows for sophisticated analysis but, at the same time, presents many new challenges for sifting through the available data and data sources to locate the most relevant and useful information. As the use of technology continues to increase, so, too, will the availability of new data sources and information.

Because of the abundant availability of data from a vast number of data sources, determining the optimal values and sources for use presents a complicated problem difficult to overcome. Accurately utilizing the available data can require both a team of individuals possessing extensive domain expertise as well as many months of work to evaluate the outcomes. The process can involve exhaustively searching existing literature, publications, and other available data to identify and study relevant data sources that are available both privately and publicly.

While this approach can often provide effective academic analysis, applying these types of analytical techniques to domains requiring accurate results obtainable only through time and resource intensive research is incompatible with modern applications' demands. For example, the developed process for evaluating outcomes may not line up with specific circumstances or individual considerations. In this scenario, applying the process requires extrapolation to fit the specific circumstances, dilute the process's effectiveness, or require spending valuable time and resources to modify the process. As a result, processes developed in this way typically provide only generalized guidance insufficient for repurposing in other settings or by other users. As more detailed and individualized data becomes available, demand for the ability to accurately discern relevant data points from the sea of available information, and efficiently apply that data across thousands of personalized scenarios increases.

SUMMARY

Certain embodiments of the present disclosure relate to a non-transitory computer readable medium, including instructions that when executed by one or more processors cause a system to perform a method for generating a statistically covaried machine learning model for performance measurement of service providers. The method may include receiving a configuration file that includes one or more parameters associated with a plurality of individuals; parsing the configuration file to generate a database query; executing the database query on input data to generate sets of tabulated data of individuals of the plurality of individuals, wherein the sets of tabulated data of individuals satisfy values of the one or more parameters associated with the plurality of individuals; determining one or more measures of service providers listed in the configuration file using two or more tabulated data of individuals from the sets of tabulated data of individuals, wherein the sets of tabulated data of individuals includes data representing the service providers; and generating a covaried machine learning model using a machine learning platform, wherein the covaried machine learning model is generated by training a machine learning model on the machine learning platform using the one or more measures as training data, wherein the one or more measures are statistically covaried before providing them as input to the machine learning model.

According to some disclosed embodiments, parameters associated with a plurality of individuals may further include a first set of parameters to define a population of individuals; and a second set of parameters to determine individuals of the defined population of individuals to be included in a set of tabulated data of individuals of the sets of tabulated data of individuals.

According to some disclosed embodiments, parsing the configuration file to generate a database query may further include accessing one or more query templates stored in a data storage, wherein the one or more query templates map to the one or more parameters; populating the one or more query templates using values, wherein the values are obtained from the configuration file; generating a job to be added to a queue of a job server; and submitting the job to a query server to generate the database query.

According to some disclosed embodiments, parsing the configuration file to generate a database query may further include retrieving a stored database query from a data storage, wherein a measure in the configuration file matches a measure associated with the stored database query.

According to some disclosed embodiments, the method may further include pre-determining one or more measures based on stored database queries in the data storage; covarying the one or more pre-determined measures; and storing the covaried one or more pre-determined measures in the data storage.

According to some disclosed embodiments, the method may further include retrieving the stored covaried one or more pre-determined measures in the data storage; and providing the covaried one or more pre-determined measures as input to the machine learning model.

According to some disclosed embodiments, determining one or more measures of service providers listed in the configuration file using two or more tabulated data of individuals may further include parsing the configuration file to generate a second database query; executing the second database query on the input data to generate a second set of tabulated data of individuals of the plurality of individuals; and determining a measure using two or more tabulated data of individuals, wherein the two or more tabulated data of individuals comprises of the second set of tabulated data of individuals.

According to some disclosed embodiments, executing the second database query on the input data may further include providing the sets of tabulated data of individuals as input data for the second database query.

According to some disclosed embodiments, determining one or more measures of service providers listed in the configuration file providers using two or more tabulated data of individuals may further include generating a table of the one or more measures of the service providers and pointers to associated individuals.

According to some disclosed embodiments, the method may further include predicting adjusted measures, wherein the adjusted measures are predicted by executing the covaried machine learning model, wherein the determined one or more measures are provided as input to the covaried machine learning model; and storing the predicted adjusted measures in a data storage.

According to some disclosed embodiments, the method may further include generating one or metrics indicating performance of the covaried machine learning model, wherein the one or more metrics are generated by executing the covaried machine learning model.

According to some disclosed embodiments, the method may further include supplying the covaried machine learning model to a search engine for the service providers; and adjusting the results of the search engine for the service providers based on the one or more metrics indicating performance of the covaried machine learning model.

According to some disclosed embodiments, the values of the one or more parameters associated with the plurality of individuals comprises numbers, strings, or boolean values.

According to some disclosed embodiments, the sets of tabulated data of individuals satisfy values of the parameters associated with the plurality of individuals may further include aggregating the data of individuals that satisfy values of the parameters associated with the plurality of individuals.

According to some disclosed embodiments, the parameters in the configuration file are pairs of keys and values.

According to some disclosed embodiments, the configuration file is formatted as a YAML file.

Certain embodiments of the present disclosure relate to a method performed by a system for generating a covaried machine learning model for performance measurement of service providers. The method can include receiving a configuration file, wherein the configuration file includes one or more parameters associated with a plurality of individuals; parsing the configuration file to generate a database query; executing the database query on input data to generate sets of tabulated data of individuals of the plurality of individuals, wherein the sets of tabulated data of individuals satisfy values of the one or more parameters associated with the plurality of individuals; determining one or more measures of service providers listed in the configuration file using two or more tabulated data of individuals from the sets of tabulated data of individuals, wherein the sets of tabulated data of individuals includes data representing the service providers; and generating a risk adjusted machine learning model using a machine learning platform, wherein the risk adjusted machine learning model is generated by training a machine learning model on the machine learning platform using the one or more measures as training data, wherein the one or more measures are statistically covaried before providing them as input to the machine learning model.

According to some disclosed embodiments, parsing the configuration file to generate a database query may further include accessing one or more query templates stored in a data storage, wherein the one or more query templates map to the one or more parameters; populating the one or more query templates using values, wherein the values are obtained from the configuration file; generating a job to be added to a queue of a job server; and submitting the job to a query server to generate the database query.

According to some disclosed embodiments, determining one or more measures of service providers listed in the configuration file using two or more tabulated data of individuals may further include parsing the configuration file to generate a second database query; executing the second database query on the input data to generate a second set of tabulated data of individuals of the plurality of individuals; and determining a measure using two or more tabulated data of individuals, wherein the two or more tabulated data of individuals comprises of the second set of tabulated data of individuals.

Certain embodiments of the present disclosure relate to a system for generating a covaried machine learning model. The system includes one or more processors executing processor-executable instructions stored in one or more memory devices to perform a method. The method may include receiving a configuration file, wherein the configuration file includes one or more parameters associated with a plurality of individuals; parsing the configuration file to generate a database query; executing the database query on input data to generate sets of tabulated data of individuals of the plurality of individuals, wherein the sets of tabulated data of individuals satisfy values of the one or more parameters associated with the plurality of individuals; determining one or more measures of service providers listed in the configuration file using two or more tabulated data of individuals from the sets of tabulated data of individuals, wherein the sets of tabulated data of individuals includes data representing the service providers; and generating a covaried machine learning model using a machine learning platform, wherein the covaried machine learning model is generated by training a machine learning model on the machine learning platform using the one or more measures as training data, wherein the one or more measures are statistically covaried before providing them as input to the machine learning model.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
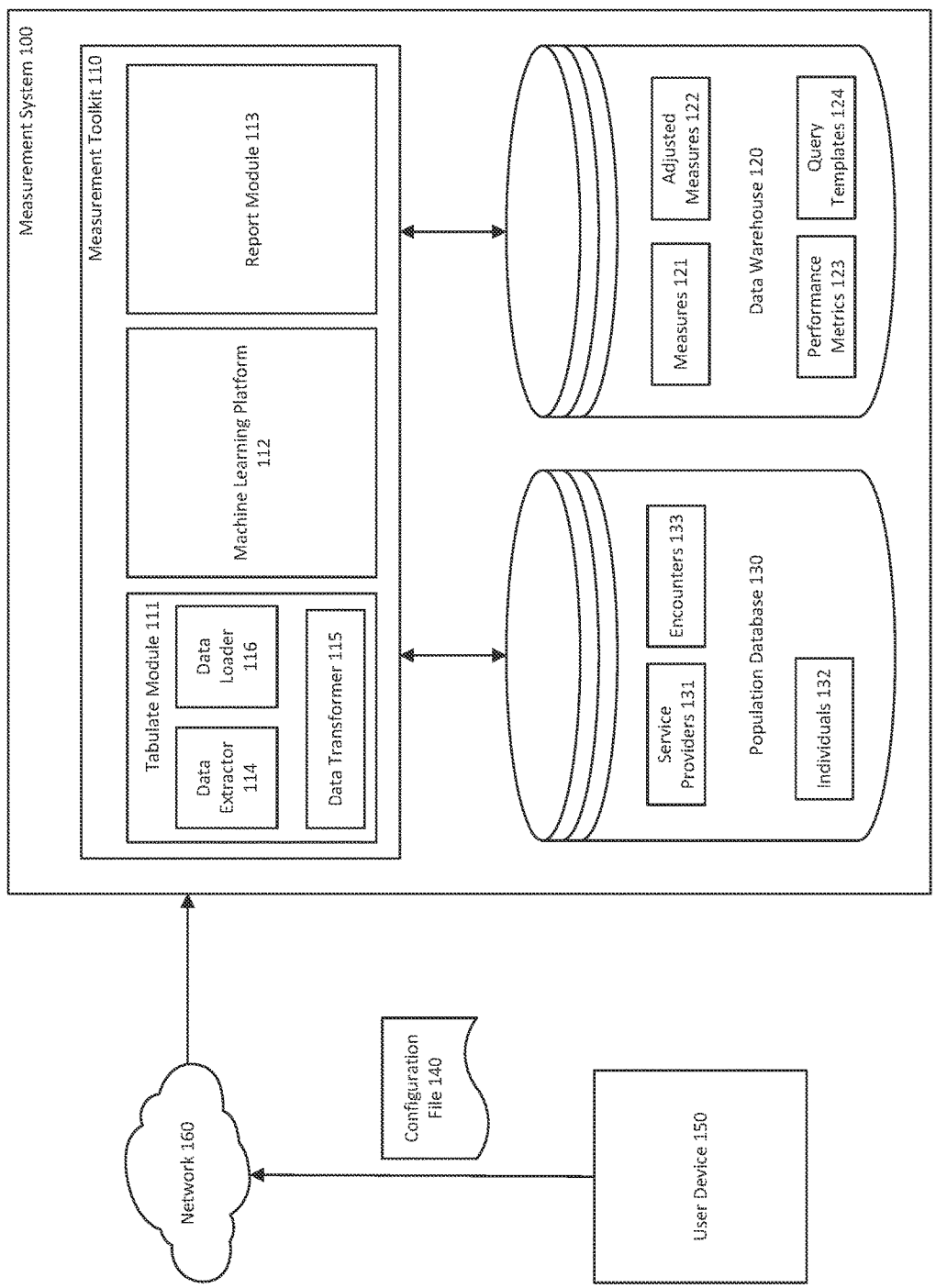
FIG. 1 is a block diagram showing various exemplary components of a measurement system for generating performance measures, according to some embodiments of the present disclosure.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating large numbers of data sources and vast amounts of data used in the creation of a machine learning model. These technologies can use information relevant to the specific domain and application of a machine learning model to prioritize potential data sources. Further, the technologies and techniques herein can interpret the available data sources and data to extract probabilities and outcomes associated with the machine learning model's specific domain and application. The described technologies can synthesize the data into a coherent machine learning model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case-by-case basis. Further, these technologies can evaluate a system where the process for evaluating outcomes of data may be set up easily and repurposed by other uses of the technologies.

Technologies may utilize machine learning models to automate the process and predict responses without human intervention. The performance of such machine learning models is usually improved by providing more training data. A machine learning model's prediction quality is evaluated manually to determine if the machine learning model's needs further training. Embodiments of these technologies described can help improve machine learning model predictions using the quality metrics of predictions requested by a user.

FIG. 1 is a block diagram showing various exemplary components of a measurement system 100 for generating performance measures, according to some embodiments of the present disclosure. Performance measures may include evaluating service providers' measures and metrics of machine learning models recommending the service providers. A service provider's measures may include the effectiveness of service providers as defined by a user of measurement system 100. A user of measurement system 100 may define measures of service providers' effectiveness using a text configuration file.

A measure may be an occurrence of an event over a period of time. A service provider's performance measure may be defined as encounters of individuals with the service provider over the requested period. A measure's definition may also definitions of the types of encounters and types of responses.

Measurement system 100 may utilize the evaluated measures of service providers' effectiveness to determine a machine learning model's performance measures to recommend service providers. Measurement system 100 can determine the machine learning model's performance by comparing the effectiveness of service providers recommended by the machine learning model to the machine learning model's ranking of service providers.

As illustrated in FIG. 1, measurement system 100 may include measurement toolkit 110 to evaluate various performance measures and data warehouse 120 to store the evaluated performance measures in performance measures 1. Measurement toolkit 110 may help determine performance measures using data from population database 130. Population database 130 may aid in evaluating measures 121 based on service providers 131 associated with individuals 132 through encounters 133. Measurement system 100 may utilize configuration file 140 provided using user device 150 to determine the measures 121 of service providers 131. User device 150 may be a processor or a complete computing device, such as laptops, desktop computers, mobile devices, smart home appliances, IoT devices, etc. Configuration file 140 may include definitions of performance measures as requested by a user of user device 150. Configuration file 140 and other information may be provided to measurement system 100 over network 160.

As illustrated in FIG. 1, measurement toolkit 110 may include tabulate module 111, machine learning (ML) platform 112, and report module 113 to identify the requested performance measures of service providers 131. Measurement toolkit 110 may retrieve the relevant data for evaluating measures using the tabulate module 111. Measurement toolkit 110 may use Machine Learning (ML) platform 112 to determine the effectiveness of machine learning models used to recommend service providers and predict and adjust evaluated measures. In some embodiments, measurement toolkit 110 may utilize ML platform 112 to train a Machine Learning (ML) model to predict and adjust evaluated measures.

Tabulate module 111 of measurement toolkit 110 may evaluate measures of service providers 131 by generating tables of individuals 132 meeting certain criteria. Tabulate module 111 may query the population database 130 to identify individuals 132 who meet the criteria. The criteria for the selection of individuals of individuals 132 may be determined using configuration file 140 contents. Configuration file 140 may include configurable parameters to filter the data that meet the criteria. Tabulate module 111 may parse the configuration file 140 to generate database queries to query the population database 130. A detailed description of the process of generating and executing database queries is provided in FIG. 2A description below.

Tabulate module 111 may retrieve data from a variety of data sources (e.g., external reviews of service providers, claims data and healthcare records of individuals) and process the data so that it may be used with the remainder of measurement system 100. Tabulate module 111 may further include a data extractor 114, data transformer 115, and data loader 115 modules. Data extractor 114, data transformer 115 may work together to generate the data in population database 130. Data transformer 115 may connect the disparate data extracted by data sources by data extractor 114 and store in population database 130.

Data extractor 114 retrieves data from data sources including data related to service providers 131, individuals 132 and encounters 133. Each of these data sources may represent a different type of data source. For example, data source may be a database similar to population database 130. Data source may represent structured data, such as healthcare records and claims data of individuals. In some embodiments, data sources may be flat files, such as service providers reviews. Further, data sources may contain overlapping or completely disparate data sets. In some embodiments, data source may contain information about individuals 132 while other data sources may contain various insurance claim and medical treatment data of the individuals 132. Data extractor 114 may interact with the various data sources, retrieve the relevant data, and provide that data to the data transformer 115.

Data transformer 115 may receive data from data extractor 114 and process the data into standard formats. In some embodiments, data transformer 115 may normalize data such as dates. For example, a data source for healthcare records may store dates in day-month-year format while data source for claims data may store dates in year-month-day format. In this example, data transformer 115 may modify the data provided through data extractor 114 into a consistent date format. Accordingly, data transformer 115 may effectively clean the data provided through data extractor 114 so that all of the data, although originating from a variety of sources, has a consistent format. For example, claims data may include middle names of Individuals 132 but healthcare records may not include the middle names. In the second example, data transformer 115 may include the missing middle name in healthcare records.

Moreover, data transformer 115 may extract additional data points from the data sent by data extractor 114. For example, data transformer may process a date in year-month-day format by extracting separate data fields for the year, the month, and the day. Data transformer may also perform other linear and non-linear transformations and extractions on categorical and numerical data such as normalization and demeaning. Data transformer 115 may provide the transformed and/or extracted data to data loader 114. In some embodiments, data transformer 115 may store the transformed data in population database 130 for later use by data loader 116 and other modules of tabulate module 111.

Data loader 116 may receive the normalized data from data transformer 115. Data loader 116 may merge the data into varying formats depending on the specific requirements of measure system 100 and store the data in an appropriate storage mechanism such as population database 130.

ML platform 112 may help predict measures of future encounters between individuals 132 and service providers 131 based on measures evaluated by tabulate module 111. ML platform 112 may also help predict measures of a population of individuals based on the measures of another population as evaluated by tabulate module 111. In some embodiments, ML platform 112 may take measures evaluated by tabulate module 111 in one scenario as input to predict measures in a different scenario. ML platform 112 may predict measures due to a lack of data to properly evaluate measures requested by a user. The alternate time period, population, and scenarios to predicted measures may be defined in configuration file 140.

Measurement system 100 may generate a machine learning job to predict future measures based on measures requested by a user of measurement system 100. Machine learning job generation may include the generation of a machine learning model. Measurement system 100 may help generate the machine learning model to predict future measures by training the machine learning models. The machine learning models used for predicting future measures may be training using the measures evaluated based on requests received from users of measurement system 100.

Measurement system 100 on parsing the configuration file 140 may detect the requested measure and determine that it may need a machine learning job to predict the measure. For example, the timeline for a measure or the number of encounters requested to evaluate the measure goes beyond the current time and available encounters, indicating a request to predict the measure using a machine learning job. A machine learning job may include the execution of a machine learning model by supplying the available data. The available data may be a measure evaluated for the available time period or encounters present in population database 130.

In some embodiments, ML platform 112 may predict measures as adjustments to the type of individuals 132 and type of encounters 133. For example, a measurement system measuring physicians' effectiveness may adjust the measures from the encounters of patients with high-risk profiles. In another scenario, the measurement system may adjust physician effectiveness for complex encounters, such as surgeries. ML platform 112 may model or risk adjust measures evaluated by tabulate module 111. ML platform 112 may use a machine learning model to perform data transformations needed to adjust measures. ML platform 112 may provide measures evaluated by tabulate module 111 as training data to a machine learning model to generate risk-adjusted measures.

In some embodiments, ML platform 112 may evaluate performance metrics of a machine learning recommending the service providers 131 to individuals 132. The evaluated performance metrics may help better identify service providers of service providers 131 for recommending to individuals of individuals 132. ML platform 112 may determine the performance metrics based on the measures provided by tabulate module 111. ML platform 112 may utilize machine learning models to predict service providers' measures and identify service providers to be recommended to an individual. Service provider recommendations using ML platform 112 is described in detail in FIG. 3 description below.

Report module 113 can help prepare reports of measures of the effectiveness of service providers. The report generated by a report module 113 can be a PDF file with graphs and tables. Configuration file 140 may include the output format types and content requirements. Report module 113 may parse a portion of configuration file 140 to generate output reports.

Measurement toolkit 110 may rely on data warehouse 120 to generate the necessary code to evaluate measures of service providers and store the generated measures. As illustrated in FIG. 1, data warehouse 120 may also be storage for previously evaluated various performance measures stored in measures 121, adjusted measures 122, and performance metrics 123. Measures 121 may include measures evaluated by tabulate module 111 and other predicted measures by ML platform 112. In some embodiments, measures 121 may also include the definitions of measures as defined in configuration file 140 and used by tabulate module 111 to evaluate the measures. Adjusted measures 122 may include measures generated by measurement toolkit 110 from measures 121 to adjust for the population of individuals of individuals 132 associated with service providers of service providers 131. For example, a doctor providing services to a vulnerable population, such as a higher age group population, may have slower recovery rates than another service provider working with a younger population requiring adjustment of measures.

In various embodiments, data warehouse 120 and population database 130 may take several different forms. For example, population database 130 may be an SQL database or NoSQL database, such as those developed by MICROSOFT™, REDIS, ORACLE™ CASSANDRA, MYSQL, various other types of databases, data returned by calling a web service, data returned by calling a computational function, sensor data, IoT devices, or various other data sources. Data warehouse 120 may store data that is used or generated during the operation of applications, such as tabulate module 111. For example, if tabulate module 111 is configured to generate measures specific to service providers such as service providers 131, then data warehouse 120 may store service providers' evaluated measures. Similarly, if ML platform 112 is configured to provide risk-adjusted measures, tabulate module 111 may retrieve previously generated measures and other related data stored in data warehouse 120. In some embodiments, data warehouse 120 and population database 130 may be fed data from an external source, or the external source (e.g., server, database, sensors, IoT devices, etc.) may be a replacement. In some embodiments, population database 130 may be data storage for a distributed data processing system (e.g., Hadoop Distributed File System, Google File System, ClusterFS, and/or OneFS). Depending on the specific embodiment of population database 130, data loader 114 may optimize the data for storing and processing in population database 130.

A measure of measures 121 may be represented by a formula for dividing two numerical values. Configuration file 140 may define the numerator or denominator to be used in evaluating the measure. In some embodiments, a combination of values defined in the configuration file 140 may be used to determine the numerator or denominator values of a measure formula. In some embodiments, a first measure may be a numerator or denominator value in evaluating a second measure. A measure may need data over a timeframe and may need to be evaluated at regular intervals. In some embodiments, configuration file 140 may provide either denominator or numerator to use for calculating a measure.

In some embodiments, previously evaluated measures may be used in evaluating a measure requested in configuration file 140. For example, a measure requiring a number of people undergoing a certain procedure in a certain period may take previously calculated measures for the same people for a subset of the requested time period and retrieve encounters for the rest of the data from population database 130. Measurement system 100 may determine if previously evaluated measures of measures 121 can be used together to generate a new measure.

Adjusted measures 122 may be covaried variants of measures 121. Adjusted measures 122 may be generated using machine learning models by ML platform 112. Adjusted measures 122 may also include information about the measure definition as defined in configuration file 140. In some embodiments, adjusted measures 122 may include characteristics of service providers 131 and associated individuals 132 causing adjustment of measures. Adjusted measures 122 may include references to measures 121 from which they are generated and vice versa. Data warehouse 120 may also include performance metrics 123 representing the performance machine learning models used for generating recommendations of service providers 131 to a user.

Data warehouse 120 may also include code to help generate measures 121 in query templates 124. Query templates 124 may include classes of code, for example jinja templates or smarty templates, that may be used to generate database queries to query the population database 130. In some embodiments, query templates 124 may include database queries or portions of database queries to query the population database 130 directly. Tabulate module 111 may help generate database queries by using classes of code of query templates 124 representing various encounters 133 of individuals 132 with service providers 131. In some embodiments, query templates 124 may be part of the tabulate module 111 code base. Query templates 124 may also include special code classes for various criteria in selecting individuals 132. In some embodiments, the criteria may be a variable used in other code classes representing other aspects of a measure, such as encounters 133. In some embodiments, a measure may be represented by a code class.

In some embodiments, query templates 124 may include previously executed database queries to retrieve data meeting the requirements listed in the configuration file 140. Measures 121 may be associated with query templates 124. Measurement system 100 may regularly update measures in measures 121 associated with query templates 124 based on the updates to the population database 130. Tabulate module 111 may rely on query templates 124 to generate database queries to query the population database 130. Measurement system 100 executes database queries on population database 130 to identify a subset of the population and their activities in population database 130 and uses the identified data in evaluating measures.

Configuration file 140 may provide a definition of measures by listing the field names in population database 130 and other names to use as filter criteria in extracting values for field names from population database 130. Configuration file 140 may be presented as name-value pairs used to define the measurements requested by a user of user device 150. Configuration file 140 may include a description of service providers of service providers 131, individuals of individuals 132 receiving service. In some embodiments, configuration file 140 may also include types of service as criteria for filtering the service providers 131 and encounters 133 of individuals 132 with service providers 131.

Measurement system 100 may include a defined structure for configuration file 140, such as YAML. Structured files such as YAML files may help in defining and evaluating measurements with no custom software code. Measurement system 100 may evaluate measures of service providers 131 by querying databases (such as population database 130) storing events (such as encounters 133) associated with service providers 131. For example, a measure of a doctor's effectiveness in handling patients may include the number of encounters of the doctor with their patients, the time difference between encounters, and total time for complete recovery of the patients. Measurement system 100 may parse the configuration file 140 in YAML format to generate database queries in a query language such as SQL.

Tabulate module 111 may parse the configuration file 140 to both determine the SQL query to utilize to query the population database 130 and the values to use in query template as filters when retrieving data from population database 130. Measurement system 100 upon parsing a configuration file 140 and evaluating requested measures may store requested measures with identifiers in data warehouse 120. Measurement system 100 may use the identifiers of requested measures to determine the similarity between previously requested measures and measures listed in configuration file 140.

Measurement system 100 may provide a graphical user interface to define measures and generate a configuration file (e.g., configuration file 140). In some embodiments, measurement system 100 may provide various measures previously defined by a user in a dropdown UI. A user may generate a configuration file by selecting measures using a GUI. In some embodiments, measurement system 100 may allow editing of selected measures by updating filters, such as time period of a measure or other characteristics of individuals 132 to consider in evaluating measures of service providers 131 performance. Measurement system 100 may also include the ability to store the revised measures with new identifiers in data warehouse 120. The use of structured languages such as YAML to format configuration files and repurposing measures using a GUI may help standardize performance measures and easy generation of requests for measures.

Network 160 may take various forms. For example, network 160 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 160 may include an on-premises (e.g., LAN) network, while in other embodiments, network 160 may include a virtualized (e.g., AWS™, Azure™, IBM Cloud™ etc.) network. Further, network 160 may in some embodiments be a hybrid on-premises and virtualized network, including components of both types of network architecture.

Measurement system 100 may also help in identifying matching cohorts of individuals 132. The cohorts may differ in their association or lack of association with any service provider of service providers 131. Measurement system 100 may identify cohorts as part of evaluating measures of outcomes of encounters of individuals. Measurement system 100 may consider two cohorts of individuals 132 to be similar if the evaluated measures match between cohorts.

Measurement system 100 may begin matching cohorts by finding cohorts of individuals 132 with matching characteristics. For example, measurement system 100 may finding matching cohorts of patients by finding patients with matching pre-existing conditions, gender, age. In some embodiments, measurement system 100 may require more than one matching characteristic to select individuals for a matching cohort. The matching characteristics and the order and method of comparison may be configurable using parameters. In some embodiments, a user of user device 150 may provide configuration file with parameters for finding matching cohorts. Measurement system 100 may compare measures of the individuals of matching cohorts identified in the first step.

A matching cohort may be used in calculating measures when the other matching cohort is missing data for evaluating a measure. In some embodiments, matching cohorts may also be used in determining service provider recommendations. For example, service providers used by a cohort may be recommended to a matching cohort.

Measurement system 100 may also help identify the service providers of service providers 131 whose efficiency needs to be adjusted. Measurement system 100 may identify the need for adjustment based on measurement of efficiency of service providers and comparing them to other service providers and past measures. A wide variation in a measure may result in an automated and manual determination of service provider outcomes and adjustment of their efficiency beyond the count of outcomes.

Measurement system 100 may also help in determining individuals of individuals 132 associated with a service provider of service providers 131 that may need additional support. Measurement system 100 may make such a determination by comparing encounters of individuals with a service provider with the overall measures for the service provider or a class of service of providers. For example, a set of patients may be considered for additional support if their recovery time is higher than the average recovery time associated with their doctors.

Figure 3:
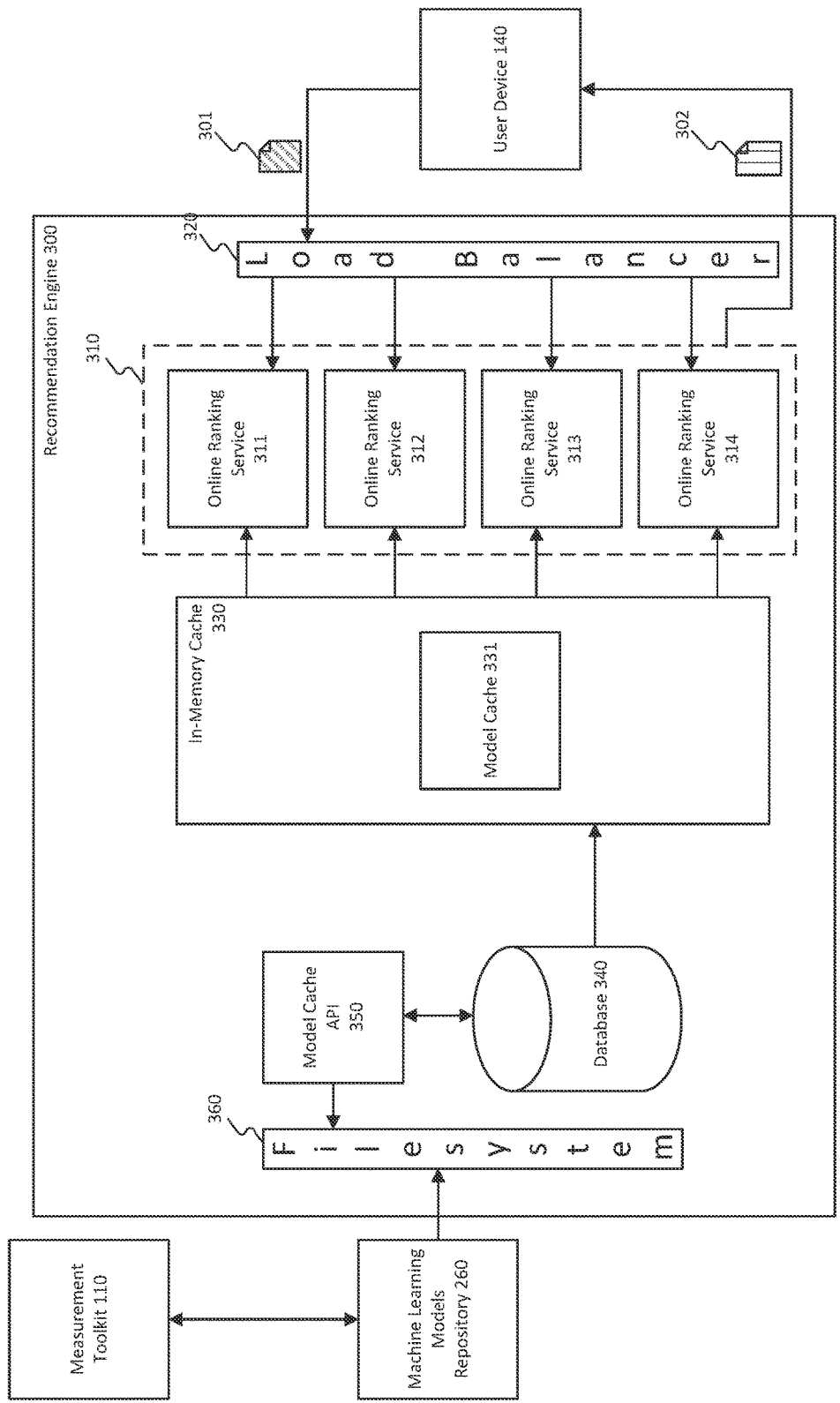
FIG. 3 is a block diagram of an exemplary recommendation engine 300, according to some embodiments of the present disclosure.

Measurement system 100 may provide additional help in the form of targeted campaigns to individuals in need of additional support. For example, an individual in need of additional support upon calling a service center may be directed to a special care unit. In another scenario, flagged information creating the need for additional support may be provided to the service care team member. Such identified individuals may also present a varied set of service provider recommendations by recommendation engine (as shown in FIG. 3).

Figure 2A:
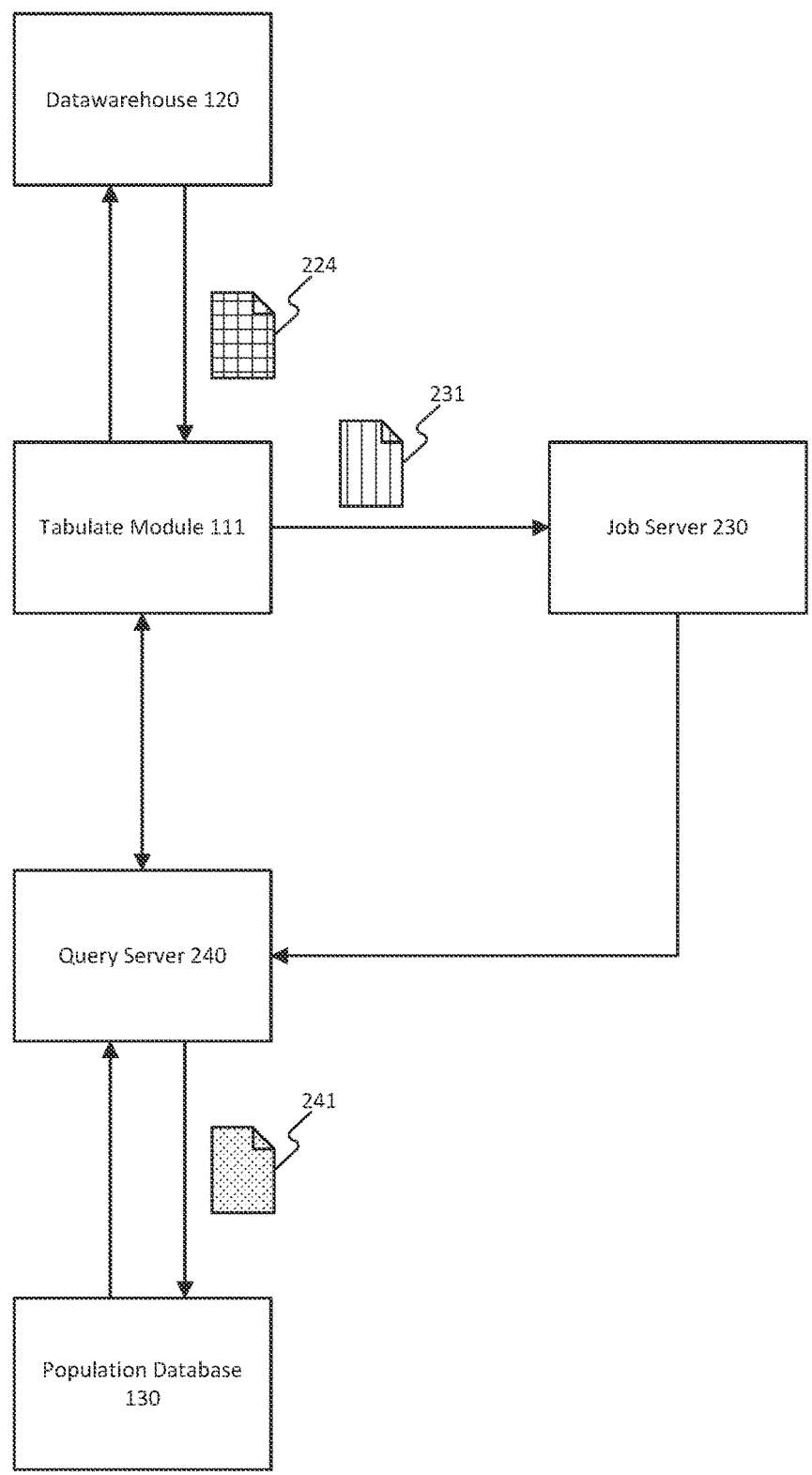
FIG. 2A is a flow diagram showing various exemplary components involved in generating database queries, according to some embodiments of the present disclosure.

FIG. 2A is a flow diagram showing various exemplary components involved in generating database queries to query the population database 130, according to some embodiments of the present disclosure. As illustrated in FIG. 2A, tabulate module 111 may help generate database queries by sending requests for code templates from data warehouse 120. Data warehouse 120 may return the code template 224 from query templates 124 (as shown in FIG. 1). Code template 224 may be a reusable class of code and may map to SQL query. In some embodiments, reusable classes of code may map to multiple SQL queries that may be combined to form a single database query. In some embodiments, the mapped SQL query may be a complete database query to retrieve data from population database 130.

Tabulate module 111 may provide values to the code template 224 to generate a database query constructed from mapped SQL queries. The values provided to the code template 224 may be received through functions of classes of code in code template 224. Code template 224 may store values provided to functions in member variables of classes of code. Tabulate module 111 may retrieve values from configuration file 140 (as shown in FIG. 1) and provide them to code template 224. The values retrieved from configuration file 140 may need to be transformed before providing them to code template 224. For example, data transformations may include grouping or adding the values.

SQL queries mapped from code template 224 may be populated using values stored in classes of code in code template 224. In some embodiments, the values provided to code template 224 and in turn used to populate mapped SQL queries may be retrieved by executing other database queries generated using tabulate module 111.

Tabulate module 111 may evaluate measures by using reusable classes of code to query the population database 130 and retrieve data about service providers 131 (as shown in FIG. 1). Data about service providers 131 may include encounters 133 (as shown in FIG. 1) of individuals (as shown FIG. 1) with service providers 131.

Tabulate module 111 may directly execute the database query generated using code template 224. In some embodiments, tabulate module 111 may delegate the query execution to job server 230 by creating job 231 and adding it to the job queue of job server 230. In some embodiments, tabulate module 111 may provide configuration file 140 and code template 224 to job server 230 to generate and execute a database query. In some embodiments, tabulate module 111 may provide SQL queries mapped to code template 224 to job server 230 to generate and execute a database query.

As illustrated in FIG. 2A, job server 230 or tabulate module 111 querying the population database 130 may communicate with query server 240 to generate database queries. Query server 240 may map the code template 224 to a SQL query. Query server 240 may receive function calls from member functions of classes of code in code template 224 and generate database queries. Query server 240 may translate function calls from job server 230 and tabulate module 111 to relevant database query language of population database 130. For example, population database 130 can be built using a RDBMS database, a key-value NoSQL database, or a graph database technology that require different formatted database queries. Query server 240 maps the function calls to generate SQL query 241 and queries the population database 130.

Tabulate module 111 may receive tabulated data from population database 130 either directly or as an output of job server 230. Tabulate module 111 may evaluate measures using tabulated data and store in data warehouse 120 as measures 121. Tabulate module 111 may evaluate a measure by parsing tabulated data consisting of sets of individuals retrieved using a database query. Parsing of tabulated sets of individuals may include counting the number of individuals in each table. Both measures from parsing tabulated data and measures may be cached for future use.

Tabulate module 111 may generate multiple database queries to evaluate a measure. For example, a measure that represents a percentage of the population may include multiple queries for subparts of the population. In some embodiments, multiple queries may be generated to evaluate measures with related events. For example, a measure for a percentage of people who visited an emergency room (event 1) and those who came for a second visit in a month (event 2) can result in two queries for identifying a population of individuals satisfying event 1 and the subpopulation satisfying event 2.

Figure 2B:
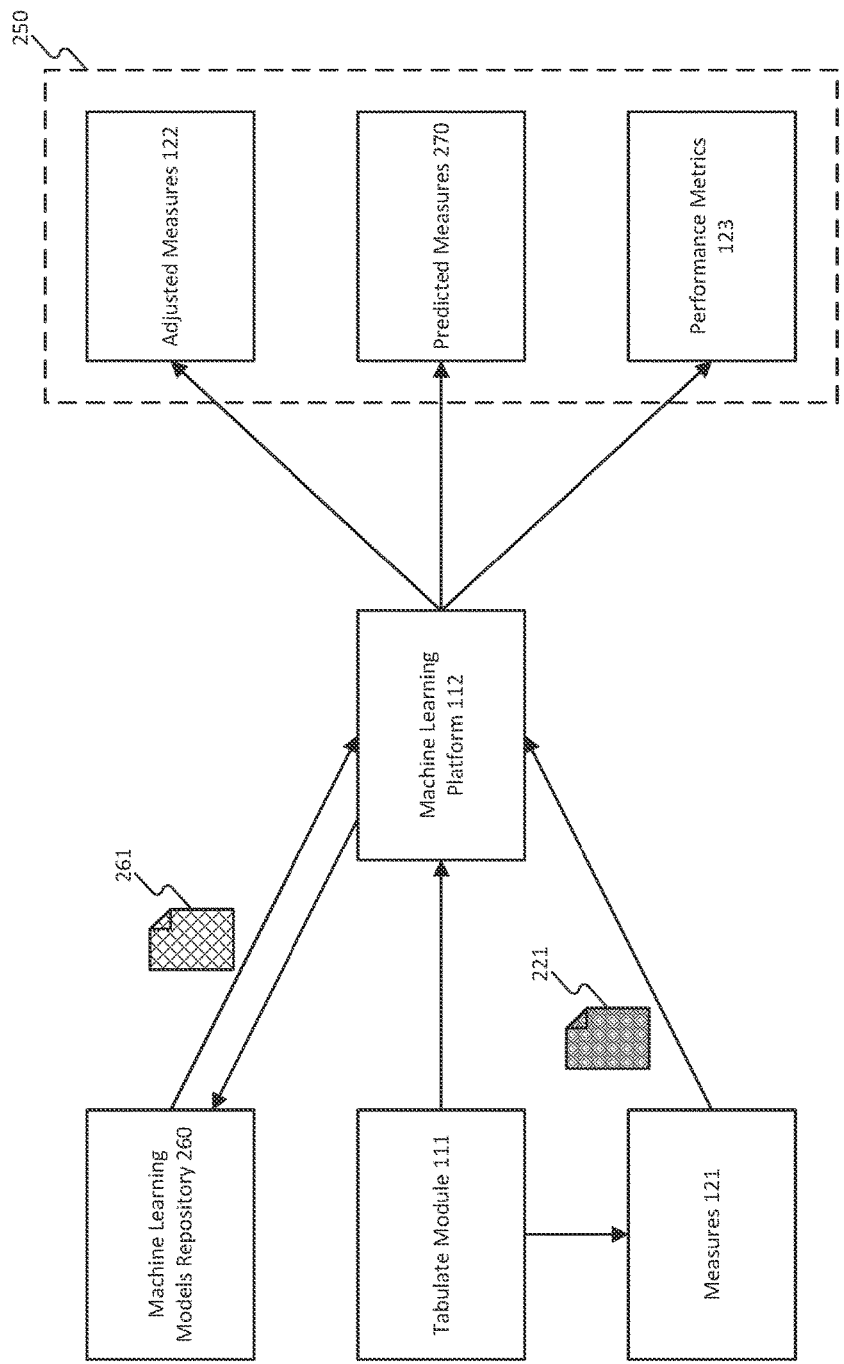
FIG. 2B is a flow diagram showing various exemplary components involved in generating measures, according to some embodiments of the present disclosure.

FIG. 2B is a flow diagram showing various exemplary components involved in generating performance measures, according to some embodiments of the present disclosure.

As illustrated in FIG. 2B, ML Platform 112 may use Machine Learning (ML) models in Machine Learning (ML) models repository 260 as input to generate performance measures. Performance measures 250 generated by ML platform 112 may include adjusted measures 122, predicted measures 270, and performance metrics 123.

ML platform 112 may generate performance measures by taking additional measures generated by tabulate module 111 as input. As illustrated in FIG. 2B, ML platform 112 may take measures from measures 121 stored in data warehouse 120 (as shown in FIG. 1) as input. In some embodiments, tabulate module 111 may directly supply measures generated by querying the population database 130 (as shown in FIG. 1).

ML Platform 112 may use input measure 221 from measures 121 and ML model 251 from ML models repository 256 to generate performance measures 250, including adjusted measures 122, predicted measures 270, performance metrics 123. Adjusted measures 122 may be adjustments to input measure 221 adjusted for the characteristics of service providers of service providers 131 (as shown in FIG. 1) and individuals of individuals 132 (as shown in FIG. 1). ML platform 112 may make multiple adjustments to various service providers associated with input measure 221. In some embodiments, ML platform 112 may also generate multiple adjusted measures for each characteristic of service providers and individuals associated with input measure. ML platform 112 may predict the performance of ML models used by recommendation engine 300 (as shown in FIG. 3) in recommending service providers of service providers 131. ML Platform 112 may use different layers of ML model 261 to generate different types of measures in performance measures 250. In some embodiments, ML platform 112 may use different ML models for each type of performance measure. In some embodiments, ML platform 112 may generate ML models as part of performance measures generation. ML platform 112 may store the generated ML models in ML models repository 260. ML platform 112 may generate new ML models by adjusting ML model 261 based on the generated performance measures 250.

ML platform 112 may link the performance measures 250 with input measure 221. The relationships between the adjusted measures 122 or predicted measures 270 and input measure 221 may be stored in data warehouse 120. In some embodiments, ML platform 112 may also store relationships between input measure 221 and performance metrics 123 of a machine learning model of ML models repository 260. The performance metrics 123 may indicate the variance between service provider recommendations of ML models used by recommendation engine 300 and the measures of the outcomes of the recommended service providers. The relationship between performance metrics 123 and input measure 221 may only exist when the variance is beyond a threshold. ML Platform 112 may request the measurement system 100 to store the performance measures 250 in data warehouse 120.

FIG. 3 is a block diagram of an exemplary recommendation engine 300, according to some embodiments of the present disclosure. As illustrated in FIG. 3, the internals of a recommendation engine 300, which includes an online ranking service 310, may help in preparing a recommended list of service providers in response to query 301. Preparation of list of service providers 302 may include ordered listing and grouping of service providers.

As illustrated in FIG. 3, recommendation engine 300 may comprise the online ranking service 310 to help determine the ranked order of the service providers to be part of a list of service providers 302 shared with a user. The online ranking service 310 may be replicated multiple times across multiple computers of a cloud computing service (not shown in the figure). The multiple instances 311-314 of online ranking service 310 may help with handling multiple users' queries simultaneously. Measurement system 100 (not shown in the figure) may receive query 301 and may delegate the online ranking service 310 to help determine the recommended list of service providers 302.

The recommendation engine 300 may also include a load balancer 320 to manage load of users' queries sent to the online ranking service 310. Load balancer 320 may manage the users' query load by algorithmically selecting an online ranking service instance of online ranking service instances 311-314. For example, load balancer 320 may receive query 301 from user device 150 and forward it to online ranking service instance 311. In some embodiments, load balancer 320 may go through a round-robin process to forward the user queries to online ranking service instances 311-314. In some embodiments, online ranking service instances 311-314 may each handle different types of user queries. The type of query may be determined by load balancer 320.

The ranking method followed by online ranking service 310 may depend on the determined type of query 301. In some embodiments, the ranked results generated by a set of online ranking service instances may be combined together by another set of online ranking service instances. For example, an online ranking service instance may rank based on the quality of healthcare provided, and another instance may rank based on the efficiency of the health care provider, and a third online ranking service may create composite ranks based on the ranking of service providers based on quality and efficiency.

Online ranking service 310 may utilize ML models to rank service providers. The online ranking service 310 may obtain the service providers through a set of ML models in ML models repository 260 and then rank them using another set of ML models in ML models repository 260. The ML models used for processing the identified service providers may reside in in-memory cache 330 for quick access. The ML models in in-memory cache 330 may be pre-selected or identified based on query 301 sent by a user. Recommendation engine 300 may include a model cache 331 to manage the ML models in the in-memory cache 330. In some embodiments, the model cache 331 may manage the models by maintaining a lookup table for different types of ML models. The model cache 331 may maintain and generate statistics about the ML models in in-memory cache 330. In some embodiments, the model cache 331 may only manage copies of models upon a user request. The model cache 331 may only include a single copy of each model in the in-memory cache 330. In some embodiments, the model cache 331 may also include multiple instances of the same ML models trained with different sets of data present in the database 340.

Measurement toolkit 110 may train ML models in ML models repository 260 before using them in recommendation engine 300 to generate a recommended list of service providers 302. Measurement toolkit 110 may train ML models based on measures requested by a user using user device 150, as described in FIG. 1 description.

ML models in the in-memory cache 330 may be regularly copied from a key-value pair database 340 containing the trained ML models of ML models repository 260. Database 340 may access ML models in the ML models repository 260 using a model cache API 350. In some embodiments, the ML models repository 260 may be part of a file system 360. Database 340 may access ML models in ML models repository 260 to train the model at regular intervals. Database 340 supplies the trained ML models determined using ML models to in-memory cache 330 to be managed by model cache 331. The accessed ML models residing in database 340 and in-memory cache 330 may be utilized by both online ranking service 310 and other services that are part of measurement system 100.

Figure 4:
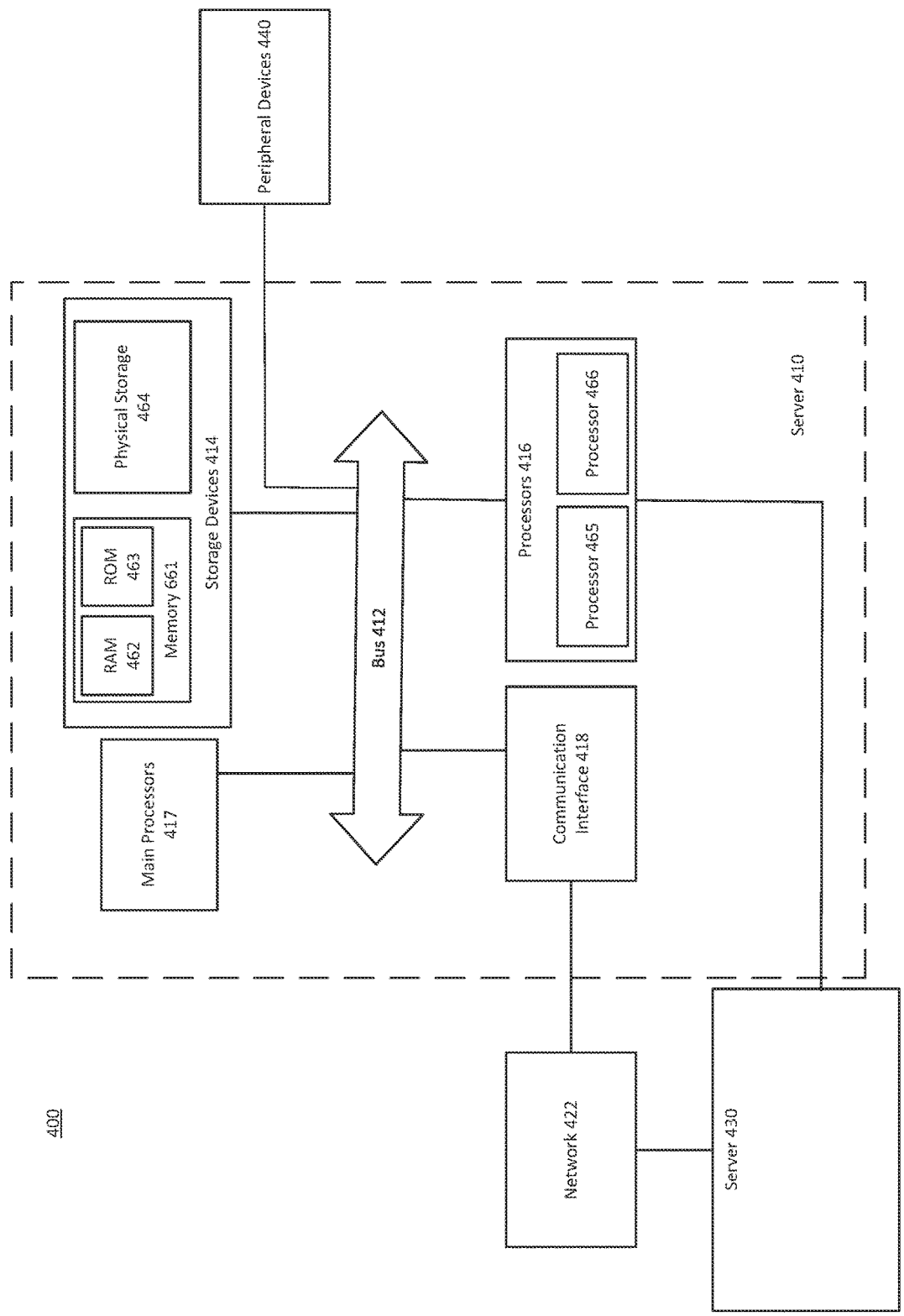
FIG. 4 illustrates a schematic diagram of an exemplary server of a distributed system, according to some embodiments of the present disclosure.

FIG. 4 illustrates a schematic diagram of an exemplary server of a distributed system, according to some embodiments of the present disclosure. According to FIG. 4, server 410 of distributed computing system 400 comprises a bus 412 or other communication mechanisms for communicating information, one or more processors 416 communicatively coupled with bus 412 for processing information, and one or more main processors 417 communicatively coupled with bus 412 for processing information. Processors 416 can be, for example, one or more microprocessors. In some embodiments, one or more processors 416 comprises processor 465 and processor 466, and processor 465 and processor 466 are connected via an inter-chip interconnect of an interconnect topology. Main processors 417 can be, for example, central processing units ("CPUs").

Server 410 can transmit data to or communicate with another server 430 through a network 422. Network 422 can be a local network, an internet service provider, Internet, or any combination thereof. Communication interface 418 of server 410 is connected to network 422, which can enable communication with server 430. In addition, server 410 can be coupled via bus 412 to peripheral devices 440, which comprises displays (e.g., cathode ray tube (CRT), liquid crystal display (LCD), touch screen, etc.) and input devices (e.g., keyboard, mouse, soft keypad, etc.).

Server 410 can be implemented using customized hard-wired logic, one or more ASICs or FPGAs, firmware, or program logic that in combination with the server causes server 410 to be a special-purpose machine.

Server 410 further comprises storage devices 414, which may include memory 461 and physical storage 464 (e.g., hard drive, solid-state drive, etc.). Memory 461 may include random access memory (RAM) 462 and read-only memory (ROM) 463. Storage devices 414 can be communicatively coupled with processors 416 and main processors 417 via bus 412. Storage devices 414 may include a main memory, which can be used for storing temporary variables or other intermediate information during execution of instructions to be executed by processors 416 and main processors 417. Such instructions, after being stored in non-transitory storage media accessible to processors 416 and main processors 417, render server 410 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 416 or main processors 417 for execution. For example, the instructions can initially be carried out on a magnetic disk or solid-state drive of a remote computer. The remote computer can load the instructions into its dynamic memory and send the instructions over a telephone line using a modem. A modem local to server 410 can receive the data on the telephone line and use an infra-red transmitter to convert the data to an infra-red signal. An infra-red detector can receive the data carried in the infra-red signal, and appropriate circuitry can place the data on bus 412. Bus 412 carries the data to the main memory within storage devices 414, from which processors 416 or main processors 417 retrieves and executes the instructions.

Measurement system 100 or one or more of its components may reside on either server 410 or 430 and may be executed by processors 416 or 417. Recommendation engine 300 or one or more of its components may also reside on either server 410 or 430. In some embodiments, the components of measurement system 100 and/or recommendation engine 300 may be spread across multiple servers 410 and 430. For example, measurement toolkit 110 components 111-113 may be executed on multiple servers. Similarly, online ranking service instances 311-314 may be maintained by multiple servers 410 and 430.

Figure 5:
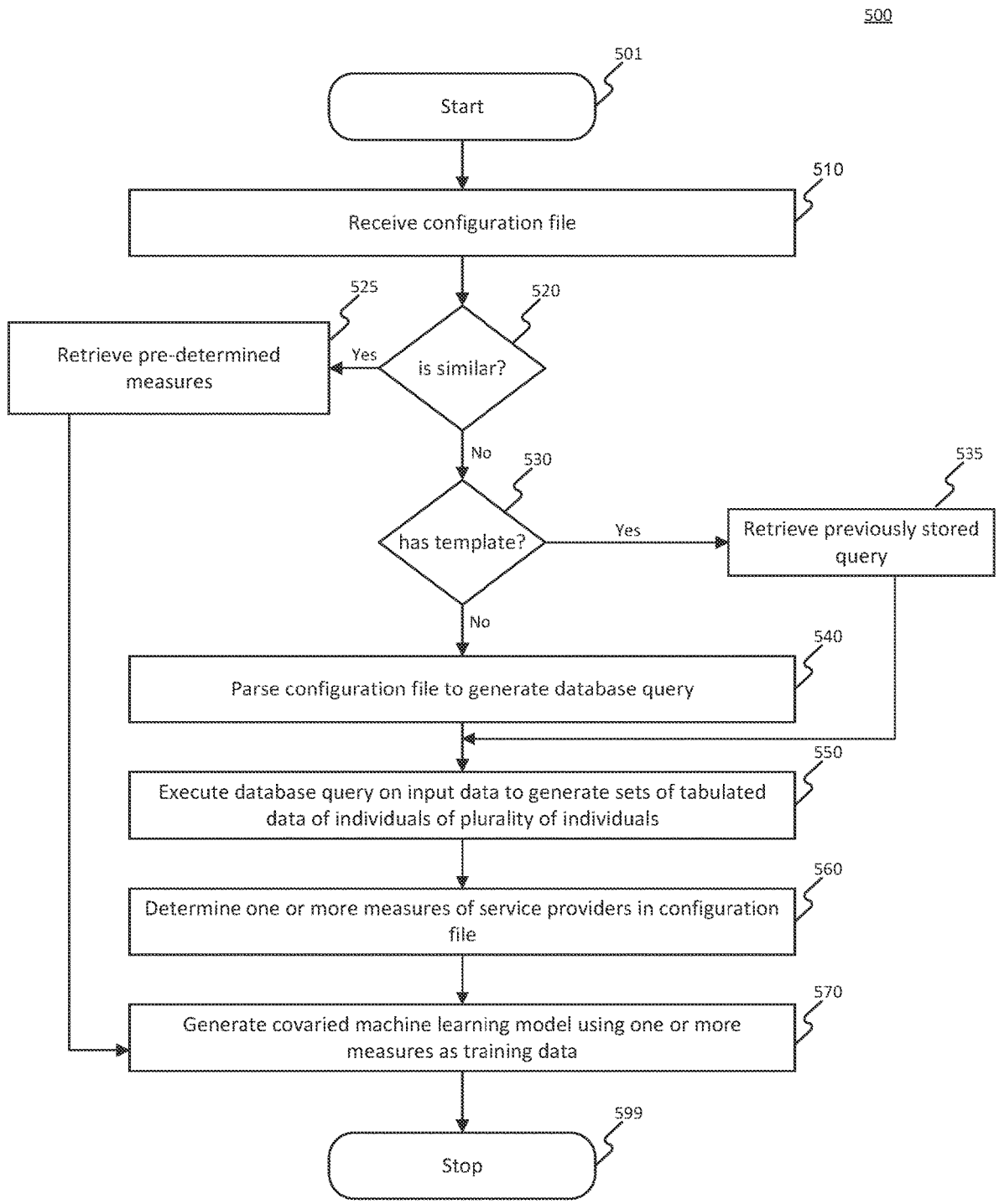
FIG. 5 is a flowchart showing an exemplary method for generating a statistically covaried machine learning model, according to some embodiments of the present disclosure.

FIG. 5 is a flowchart showing an exemplary method for generating a statistically covaried machine learning model, according to some embodiments of the present disclosure. The steps of method 500 can be performed by, for example, measurement system 100 of FIG. 1 executing on or otherwise using the features of distributed computing system 400 of FIG. 4 for purposes of illustration. It is appreciated that the illustrated method 500 can be altered to modify the order of steps and to include additional steps.

In step 510, measurement system 100 may receive a configuration file (e.g., configuration file 140 of FIG. 1). Configuration file 140 may be received over network 160 and may include parameters associated with a set of individuals. The set of individuals may be all individuals (e.g., individuals 132 of FIG. 1) whose details are stored in population database 130 (as shown in FIG. 1). In some embodiments, the set of individuals may be a subset of the total set of individuals in population database 130 meeting certain criteria. Configuration file 140 may include two different sets of required and optional parameters. The optionality of a parameter may vary with measures. Parameters in the configuration file may be presented as name-value pairs, with the value being optional. For example, database columns whose values should not be filtered may not have a value included with the parameter representing the column in the configuration file. Parameter values can be a combination of numbers, strings, boolean values. In some embodiments, values of parameters may be a set of values.

In step 520, measurement system 100 may determine if the received configuration file 140 may be similar to configuration files received previously by measurement system 100. Measurement system 100 may determine the similarity of configuration files by comparing measures requested in configuration file 140 to previously requested measures in measures 121 (as shown in FIG. 1). In some embodiments, part of the configuration file associated with measures may be similar to measures requested as part of configuration files previously received by measurement system 100. The similarity of measures may include the similarity of database queries needed to evaluate the requested measure. In some embodiments, measurement system 100 may consider two measures to be similar if they access the same database tables columns. Measurement system 100 may consider two measures to be similar upon determining the similarity of database queries and the database tables/columns needed to evaluate a measure. If the requested configuration file or a portion addressing a measure is not similar to the measures stored in data warehouse 120, then method 500 may jump to step 530.

If the requested configuration file or a portion addressing a measure is similar to the measures stored in data warehouse 120, then method 500 may proceed to step 525. In step 525, measurement system 100 may retrieve previously determined measures from measures 121. In some embodiments, the retrieved pre-determined measure of measures 121 may need to be adjusted according to the type of individuals accessed in evaluating the measure. Adjustment of the measure may include covarying the measure of service providers based on individuals associated with the service providers. Upon completion of step 525, method 500 may jump to step 570.

In step 530, measurement system 100 may determine if a SQL query (e.g., SQL query 241 of FIG. 2A) already exists for the requested measure to retrieve the data for evaluating the measure. Measurement system 100 may consider SQL query 241 if it includes the columns of database tables needed to evaluate the requested measure. In some embodiments, SQL query may include access to additional columns not required to evaluate the requested measure. In some embodiments, measurement system 100 may consider the SQL query that may need different filters to be included to evaluate the requested measure. Measurement system 100 may consider the answer to the question in step 530 as yes only if all the queries needed to evaluate the measure are available or can be obtained by adjusting filters of SQL queries. If there is no existing SQL query matching the requested measure, then method 500 may jump to step 540.

If there is an existing SQL template needed to evaluate the requested measure, then proceed to step 535. In step 535, measurement system 100 may retrieve the previously generated SQL query from data warehouse 120. SQL query may be in query templates 124. In some embodiments, query templates 124 may provide a query template that may need to be mapped to SQL query using job server 230 (as shown in FIG. 2A) and query server 240 (as shown in FIG. 2A). Upon completion of step 535, method 500 may jump to step 550.

In step 540, measurement system 100 may parse the configuration file 140 to generate a database query. Measurement system 100 may generate a database query based on the database columns needed to evaluate the requested measure. In some embodiments, measurement system 100 may identify SQL templates of query templates 124 to combine to generate the database query. Measurement system 100 may add or remove filters to SQL templates combined to generate the database query. Measurement system 100 may include values to filters added to the database query using the values provided in configuration file 140.

In step 550, measurement system 100 may execute a database query on population database 130 to retrieve a tabulated data subset of a table's values or a cartesian product of multiple tables identified by the database query. Tabulate module 111 may execute the database query to generate sets of tabulated data of individuals from a population of individuals in population database 130. Tabulate module 111 may delegate the execution of database query to job server 230. A detailed description of the process of database query execution is provided in FIG. 6 description below.

In step 560, measurement system 100 may determine measures of service providers requested in configuration file 140. Determination of a measure may include aggregating data retrieved by executing a database query in step 550. Determining measure may also include generating multiple aggregated values from various columns of the tabulate data individuals retrieved from population database 130. A measure may then be evaluated by dividing aggregated values. The aggregation of values may be based on a period of time or similarity in characteristics of the individuals whose data may be retrieved in step 550. In some embodiments, the execution of a database query may automatically generate aggregated values. For example, a database query may include database aggregation function SUM to aggregate the values. A detailed description of the process of generating a measure is provided in FIG. 8, further described below.

In step 570, measurement system 100 may generate covaried machine learning model using one or more measures as training data. Measurement system 100 may generate a covaried machine learning model by providing covaried measures determined in step 560 as training data to a machine learning model. A detailed description of the process of covarying measures is provided in FIG. 7, further described below. Measurement system 100, upon completion of step 570, completes (step 599) executing method 500 on distributed computing system 400.

Figure 6:
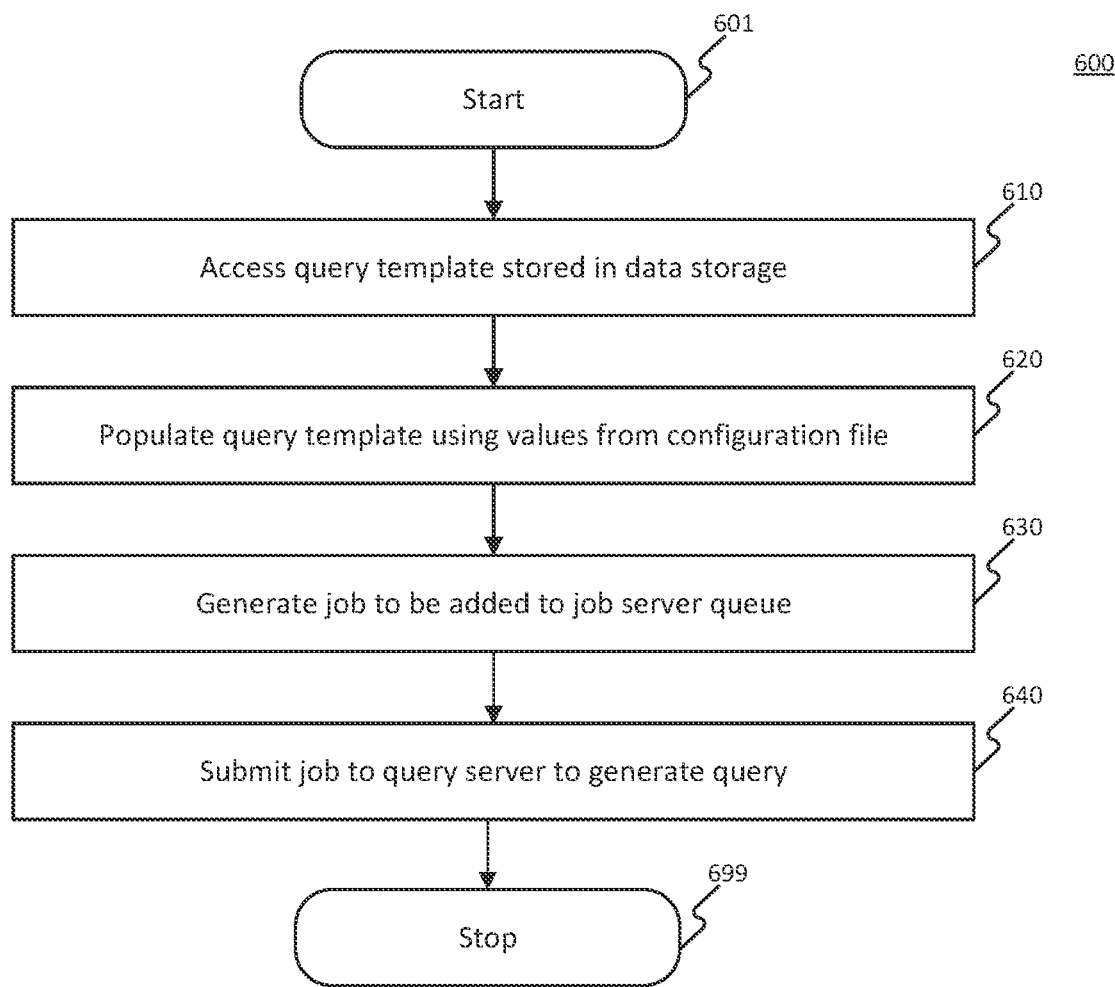
FIG. 6 is a flowchart showing an exemplary method for constructing a database query, according to some embodiments of the present disclosure.

FIG. 6 is a flowchart showing an exemplary method for constructing a database query, according to some embodiments of the present disclosure. The steps of method 600 can be performed by, for example, tabulate module 111 of FIG. 1 executing on or otherwise using the features of distributed computing system 400 of FIG. 4 for purposes of illustration. It is appreciated that the illustrated method 600 can be altered to modify the order of steps and to include additional steps.

In step 610, tabulate module 111 may access a query template of query templates 124 (as shown in FIG. 1) stored in data warehouse 120. The query template (e.g., code template 224 of FIG. 2A) of query templates 124 may be identified based on the type of data needed to evaluate a measure. The type of data may indicate the database tables columns needed to evaluate a measure. Tabulate module 111 may determine the type of data needed to evaluate a measure by comparing database tables columns accessed by a query to fields defined in a configuration file (e.g., configuration file 140 of FIG. 1).

In step 620, tabulate module 111 may populate a query template to generate a database query. Tabulate module 111 may populate query template using values from configuration file 140. In some embodiments, tabulate module 111 may utilize values from previously evaluated measures in measures 121 to populate the query template. In some embodiments, a database query may be executed to retrieve the values needed to populate the query template to generate the database query. The query template may be a reusable class of code with a member function to access the database. The reusable class of code may be converted to an appropriate database query depending on the technology of the database, for example, RDBMS or NoSQL database technologies.

In step 630, tabulate module 111 may delegate the execution of the populated database query to a job server (e.g., job server 230 of FIG. 2A). Tabulate module 111 may delegate by adding a job (e.g., job 231 of FIG. 2A) to a queue of job server 230 to execute the populated database query. Job server 230 can be an off-the-shelf job scheduling system such as condor, portable batch system. Job server 230 may execute the database query by mapping the query template to a SQL query.

In step 640, tabulate module 111 may request a query server (e.g., query server 240 of FIG. 2A) to generate a database query using the populated query template generated in step 610. In some embodiments, job server 230 or query server 240 may convert code class representing a query template to a database query (e.g., SQL query 241) in SQL or other query languages. Query server 240 may include a database driver to translate the software function calls to database queries. Measurement system 100, upon completion of step 640, completes (step 699) executing method 600 on distributed computing system 400.

Figure 7:
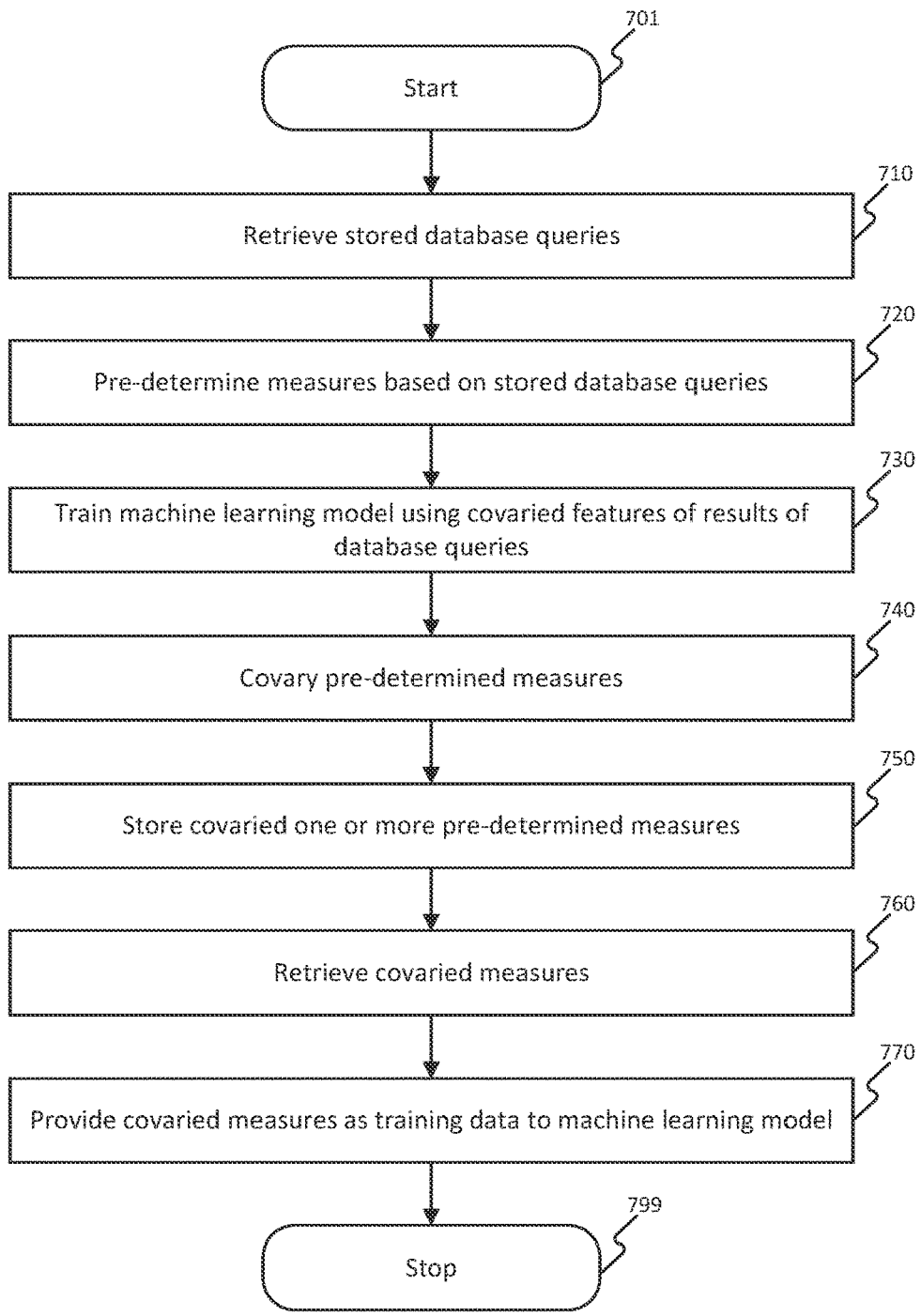
FIG. 7 is a flowchart showing an exemplary method for generating covaried measures, according to some embodiments of the present disclosure.

FIG. 7 is a flowchart showing an exemplary method for generating covaried measures, according to some embodiments of the present disclosure. The steps of method 700 can be performed by, for example, measurement system 100 of FIG. 1 executing on or otherwise using the features of distributed computing system 400 of FIG. 4 for purposes of illustration. It is appreciated that the illustrated method 700 can be altered to modify the order of steps and to include additional steps.

In step 710, measurement system 100 may retrieve stored database queries. Database queries may be stored in data warehouse 120 (as shown in FIG. 1) as query templates 124 (as shown in FIG. 1). Query templates may need to be transformed before used as database queries. For example, a query template may be transformed into a SQL query with a syntax matching the database technology requirements.

In step 720, measurement system 100 may pre-determine measures using database queries retrieved in step 710. Measurement system 100 may determine measures based on stored database queries to regularly update the measures based on the updates to the population database 130. Measures 121 may include timers indicating the interval of time for refreshing measures by re-executing database queries to access updated data. In some embodiments, measurement system 100 may pre-determine measures to aid in quicker processing of measures in the future without spending time in generating database queries and evaluating measures based on data retrieved by the database queries. Measurement system 100 may pre-determine measures that may be closely related to measures requested by a user in a configuration file (e.g., configuration file 140 of FIG. 1) provided to measurement system 100.

In step 730, measurement system 100 may retrieve features of individuals and service providers retrieved upon execution of the database query in step 720. Measurement system 100 may supply the retrieved features of the individuals and service providers to a machine learning model as training data. Measurement system 100 may covary the retrieved features before supplying as input the machine learning model. Machine learning model 100 may generate a new set of features that may be used to generate covaried measures.

In step 740, measurement system 100 may covary pre-determined measures. Measurement system 100 may covary measures based on the profile of service providers (e.g., service providers 131 of FIG. 1) and individuals (e.g., individuals 132 of FIG. 1) associated with services providers used in evaluating a measure.

In step 750, measurement system 100 may store covaried one or more pre-determined measures in data warehouse 120 as adjusted measures 122.

In step 760, measurement system 100 may retrieve covaried measures from data warehouse 120. Measurement system 100 may retrieve covaried measures stored in step 740 and other covered measures generated in the past.

In step 770, measurement system 100 may provide covaried measures as training data to a machine learning model (e.g., ML model 261). ML model 261 may include a layer to learn covary measures by using covaried measures from step 720 as input. Measurement system 100, upon completion of step 760, completes (step 799) executing method 700 on distributed computing system 400.

Figure 8:
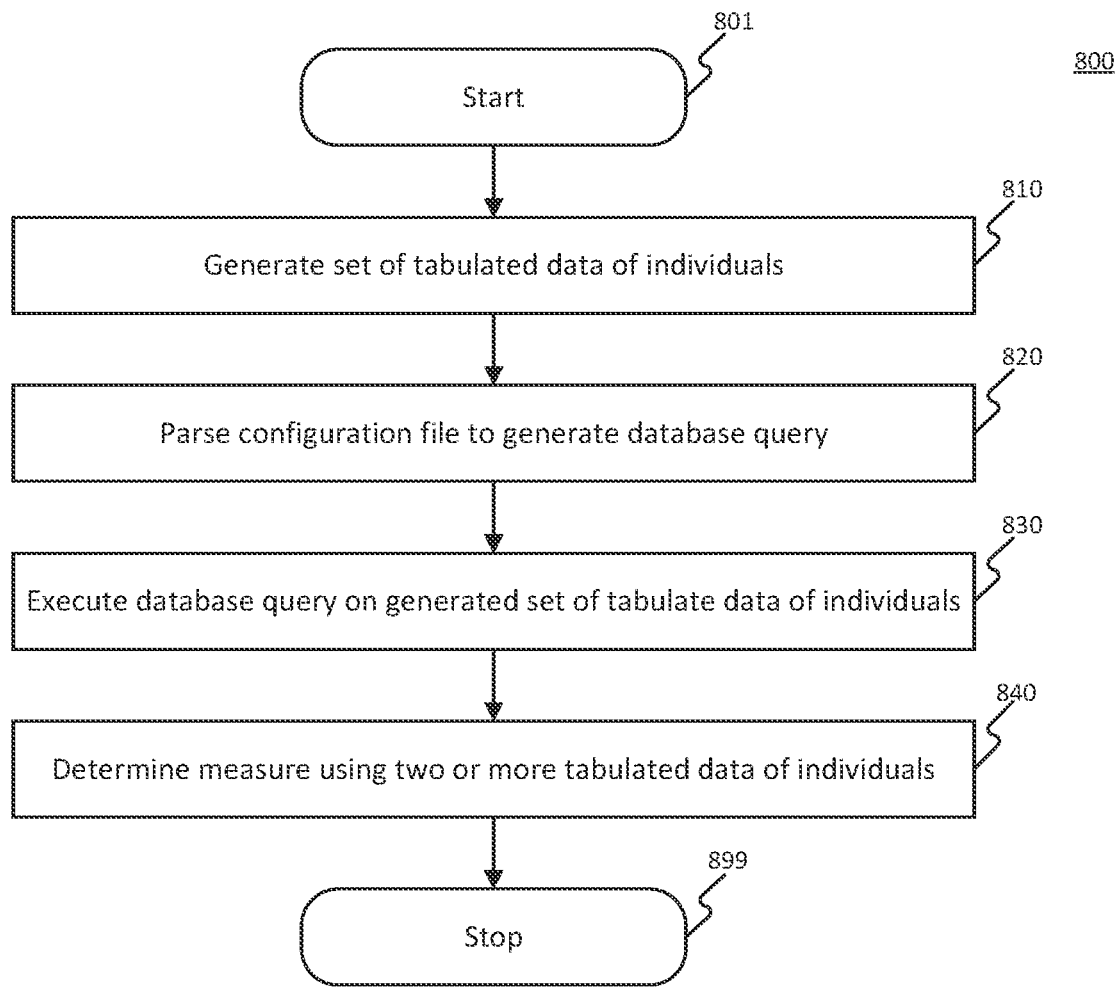
FIG. 8 is a flowchart showing an exemplary method for determining set populations and associating measures according to some embodiments of the present disclosure.

FIG. 8 is a flowchart showing an exemplary method for determining set populations and associating measures according to some embodiments of the present disclosure. The steps of method 800 can be performed by, for example, measurement system 100 of FIG. 1 executing on or otherwise using the features of distributed computing system 400 of FIG. 4 for purposes of illustration. It is appreciated that the illustrated method 800 can be altered to modify the order of steps and to include additional steps.

In step 810, measurement system 100 may generate a set of tabulated data of individuals. Measurement system 100 may generate tabulated data of individuals by executing a database query (e.g., SQL query 241 of FIG. 2A) on population database 130.

In step 820, measurement system 100 may parse configuration file (e.g., configuration file 140 of FIG. 1) to generate database query. The generated database query may be an additional query generated by parsing the configuration file 140. In some embodiments, measurement system 100 may retrieve the additional query from previously generated queries. Measurement system 100 may store database queries generated during previous requests for evaluating measures.

In step 830, measurement system 100 may execute database query on tabulated data retrieved in step 810. In some embodiments, the query executed in step 810 may be combined with the additional query generated in step 820 before executing on population database 130. Database query 810 and additional query from step 820 may be related to each other. In some embodiments, the additional query from step 820 may help update a measure evaluated using data retrieved by database query in step 810.

In step 840, measurement system 100 may determine measure using one or more tabulated data of individuals. The multiple tabulated data of individuals may be generated by executing the database queries from steps 810 and 820. Measurement system 100, upon completion of step 840, completes (step 899) executing method 800 on distributed computing system 400.

Figure 9:
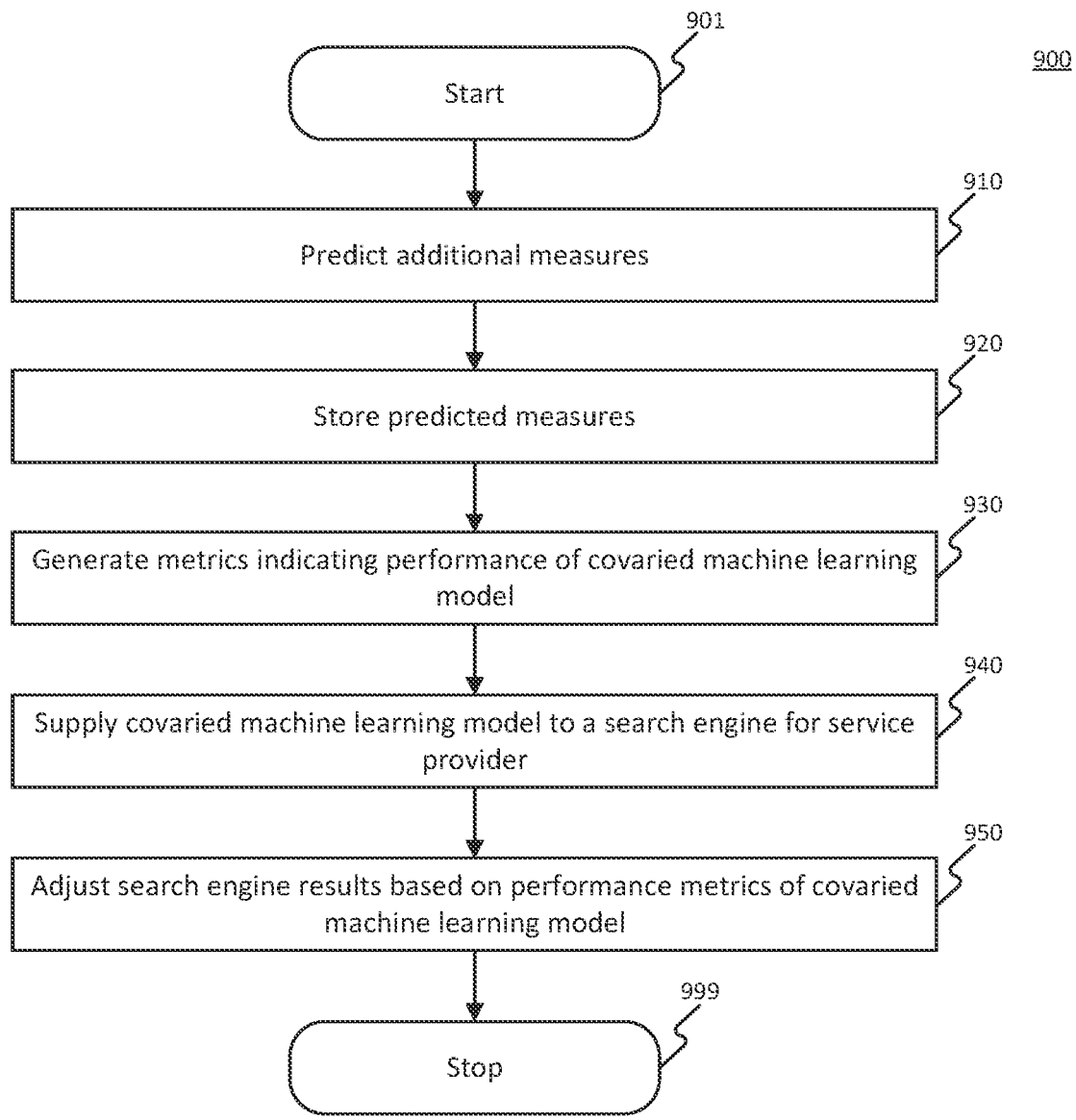
FIG. 9 is a flowchart showing an exemplary method for determining the performance of a generated covaried machine learning model, according to some embodiments of the present disclosure.

FIG. 9 is a flowchart showing an exemplary method for determining the performance of a generated covaried machine learning model, according to some embodiments of the present disclosure. The steps of method 900 can be performed by, for example, measurement system 100 of FIG. 1 executing on or otherwise using the features of distributed computing system 400 of FIG. 4 for purposes of illustration. It is appreciated that the illustrated method 900 can be altered to modify the order of steps and to include additional steps.

In step 910, measurement system 100 may generate additional measures based on the measures requested by a user in a configuration file (e.g., configuration file 140 of FIG. 1). Measurement system 100 may generate additional measures by predicting additional measures upon parsing the configuration file 140. Measurement system 100 may predict additional measures which are based on variations of values in configuration files used to retrieve input data for measures. For example, a measurement system measuring a group of service providers associated with a population of individuals can predict new measures by updating zip code values present in the configuration file to identify a different population of individuals. Measurement system 100 may rely on a machine learning model (e.g., ML model 261 of FIG. 2B) to predict additional measures.

Measurement system 100 may predict additional measures that are risk adjusted. In some embodiments, measurement system 100 may predict adjusted measures post determining measures that need to be risk-adjusted. Measurement system 100 may use a machine learning model of ML models repository 260 (as shown in FIG. 2B) to adjust measures based on characteristics of service providers and individuals and encounters between them.

In some embodiments, measurement system 100 may predict additional measurements after identifying matching cohorts of individuals. Measurement system 100 may rely on known measures of a first cohort of individuals to train the ML model 261 and use it to predict new measures for a matching cohort of individuals. Measurement system 100 may use a machine learning model from ML models repository 260 to identify matching cohorts of individuals as described in FIG. 1 description above.

In step 920, measurement system 100 may store predicted measures in data warehouse 120. Measurement system 100 may store the predicted measures along with other measures in measures 121 (as shown in FIG. 1) or predicted measures 270 (as shown in FIG. 2B). In some embodiments, predicted measures may be stored in adjusted measures 122 (as shown in FIG. 1). Measurement system 100 may determine storage location based on what manner or when they are predicted. For example, measurement system 100 predicting adjusted measures may store the predicted measures in adjusted measures 122. In another scenario, measurement system 100 predicting measures at the end of the generation of requested measures stores the additional measures in predicted measures 270.

In step 930, measurement system 100 may generate metrics (e.g., performance metrics 123 of FIG. 1) indicating the performance of a machine learning model (e.g., ML model 261). Metrics may be generated by comparing service provider recommendations generated using the machine learning model and measures of the service providers along with predicted and adjusted measures. Measurement system 100 may covary the machine learning model by providing adjusted measures as training data.

In step 940, measurement system 100 may supply covaried machine model to a search engine for service providers, such as recommendation engine 300. Measurement system 100 may supply covaried machine learning model by storing it in ML models repository 260 to be accessed by recommendation engine 300. In some embodiments, ML models repository 260 may be part of filesystem 360. Recommendation engine 300 may access covaried machine learning model using Model cache API 350 calls to file system 360.

In step 950, measurement system 100 may adjust search engine results based on performance metrics (e.g., performance metrics 123) of the covaried machine learning model. The covaried machine learning model trained with performance measurement data of service providers may update service provider recommendations by dropping service providers with lower performance measures. In some embodiments, the service provider recommendations are based on adjusted measures used to train the covaried machine learning model. An adjusted measure may indicate service provide outcomes to be weighed less due to the characteristics of individuals associated with the service provider. For example, a physician may be recommended even though their patients have longer recovery because their patients are part of the high-risk group. Measurement system 100, upon completion of step 950, completes (step 999) executing method 900 on distributed computing system 400.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform a method for generating a statistically covaried machine learning model for performance measurement of service providers, the method comprising:

receiving a configuration file that includes one or more parameters associated with a plurality of individuals;

parsing the configuration file to generate a database query;

executing the database query on input data to generate sets of tabulated data of individuals of the plurality of individuals in the input data, wherein the sets of tabulated data of individuals satisfy values of the one or more parameters associated with the plurality of individuals;

determining one or more measures of service providers listed in the configuration file using two or more tabulated data of individuals from the sets of tabulated data of individuals, wherein the sets of tabulated data of individuals includes data representing the service providers; and generating a covaried machine learning model using a machine learning platform, wherein the covaried machine learning model is generated by training a machine learning model on the machine learning platform using the one or more measures as training data, wherein the one or more measures are statistically covaried before providing them as input to the machine learning model.

2. The non-transitory computer readable medium of claim 1, wherein parameters associated with a plurality of individuals further comprises:

a first set of parameters to define a population of individuals; and a second set of parameters to determine individuals of the defined population of individuals to be included in a set of tabulated data of individuals of the sets of tabulated data of individuals.

3. The non-transitory computer readable medium of claim 1, wherein parsing the configuration file to generate a database query, further comprises:

accessing one or more query templates stored in a data storage, wherein the one or more query templates map to the one or more parameters;

populating the one or more query templates using values, wherein the values are obtained from the configuration file;

generating a job to be added to a queue of a job server; and submitting the job to a query server to generate the database query.

4. The non-transitory computer readable medium of claim 1, wherein parsing the configuration file to generate a database query further comprises:

retrieving a stored database query from a data storage, wherein a measure in the configuration file matches a measure associated with the stored database query.

5. The non-transitory computer readable medium of claim 4, further comprises:

pre-determining one or more measures based on stored database queries in the data storage;

covarying the one or more pre-determined measures; and storing the covaried one or more pre-determined measures in the data storage.

6. The non-transitory computer readable medium of claim 5 further comprises:

retrieving the stored covaried one or more pre-determined measures in the data storage; and providing the covaried one or more pre-determined measures as input to the machine learning model.

7. The non-transitory computer readable medium of claim 1, wherein determining one or more measures of service providers listed in the configuration file using two or more tabulated data of individuals further comprises:

parsing the configuration file to generate a second database query;

executing the second database query on the input data to generate a second set of tabulated data of individuals of the plurality of individuals; and determining a measure using two or more tabulated data of individuals, wherein the two or more tabulated data of individuals comprises of the second set of tabulated data of individuals.

8. The non-transitory computer readable medium of claim 7, wherein executing the second database query on the input data further comprises:

providing the sets of tabulated data of individuals as input data for the second database query.

9. The non-transitory computer readable medium of claim 1, wherein determining one or more measures of service providers listed in the configuration file providers using two or more tabulated data of individuals further comprises:

generating a table of the one or more measures of the service providers and pointers to associated individuals.

10. The non-transitory computer readable medium of claim 1 further comprises:

extracting features from sets of tabulated data of individuals;

covarying features to generate covaried features;

training the machine learning model using covaried features as input;

predicting adjusted measures, wherein the adjusted measures are predicted by executing the covaried machine learning model; and storing the predicted adjusted measures in a data storage.

11. The non-transitory computer readable medium of claim 1 further comprises:

generating one or metrics indicating performance of the covaried machine learning model, wherein the one or more metrics are generated by executing the covaried machine learning model.

12. The non-transitory computer readable medium of claim 1 further comprises:

supplying the covaried machine learning model to a search engine for the service providers; and adjusting the results of the search engine for the service providers based on the one or more metrics indicating performance of the covaried machine learning model.

13. The non-transitory computer readable medium of claim 1, wherein the values of the one or more parameters associated with the plurality of individuals comprises numbers, strings, or boolean values.

14. The non-transitory computer readable medium of claim 1, wherein the sets of tabulated data of individuals satisfy values of the parameters associated with the plurality of individuals further comprises:

aggregating the data of individuals that satisfy values of the parameters associated with the plurality of individuals.

15. The non-transitory computer readable medium of claim 1, wherein the parameters in the configuration file are pairs of keys and values.

16. The non-transitory computer readable medium of claim 1, wherein the configuration file is formatted as a yet another markup language file.

17. A method performed by a system for generating a covaried machine learning model for performance measurement of service providers, the method comprising:

receiving a configuration file, wherein the configuration file includes one or more parameters associated with a plurality of individuals;

parsing the configuration file to generate a database query;

executing the database query on input data to generate sets of tabulated data of individuals of the plurality of individuals in the input data, wherein the sets of tabulated data of individuals satisfy values of the one or more parameters associated with the plurality of individuals;

determining one or more measures of service providers listed in the configuration file using two or more tabulated data of individuals from the sets of tabulated data of individuals, wherein the sets of tabulated data of individuals includes data representing the service providers; and generating a risk adjusted machine learning model using a machine learning platform, wherein the risk adjusted machine learning model is generated by training a machine learning model on the machine learning platform using the one or more measures as training data, wherein the one or more measures are statistically covaried before providing them as input to the machine learning model.

18. The method of claim 17, wherein parsing the configuration file to generate a database query, further comprises:

accessing one or more query templates stored in a data storage, wherein the one or more query templates map to the one or more parameters;

populating the one or more query templates using values, wherein the values are obtained from the configuration file;

generating a job to be added to a queue of a job server; and submitting the job to a query server to generate the database query.

19. The method of claim 17, wherein determining one or more measures of service providers listed in the configuration file using two or more tabulated data of individuals further comprises:

parsing the configuration file to generate a second database query;

executing the second database query on the input data to generate a second set of tabulated data of individuals of the plurality of individuals; and determining a measure using two or more tabulated data of individuals, wherein the two or more tabulated data of individuals comprises of the second set of tabulated data of individuals.

20. A machine learning model generation system comprising:

one or more memory devices storing processor-executable instructions; and one or more processors configured to execute instructions to cause the machine learning model generation system to perform:

receiving a configuration file, wherein the configuration file includes one or more parameters associated with a plurality of individuals;

parsing the configuration file to generate a database query;

executing the database query on input data to generate sets of tabulated data of individuals of the plurality of individuals in the input data, wherein the sets of tabulated data of individuals satisfy values of the one or more parameters associated with the plurality of individuals;

determining one or more measures of service providers listed in the configuration file using two or more tabulated data of individuals from the sets of tabulated data of individuals, wherein the sets of tabulated data of individuals includes data representing the service providers; and generating a covaried machine learning model using a machine learning platform, wherein the covaried machine learning model is generated by training a machine learning model on the machine learning platform using the one or more measures as training data, wherein the one or more measures are statistically covaried before providing them as input to the machine learning model.

* * * * *